Aug. 7, 1951          G. A. PERLEY          2,563,062
ELECTROSTATIC SHIELDS FOR PH ELECTRODES
Filed Jan. 7, 1947
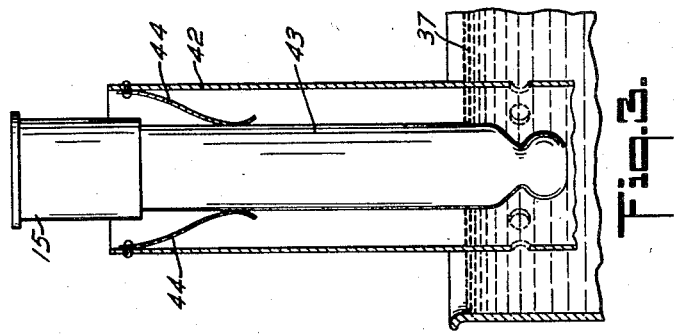
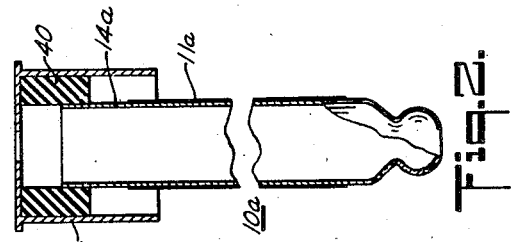
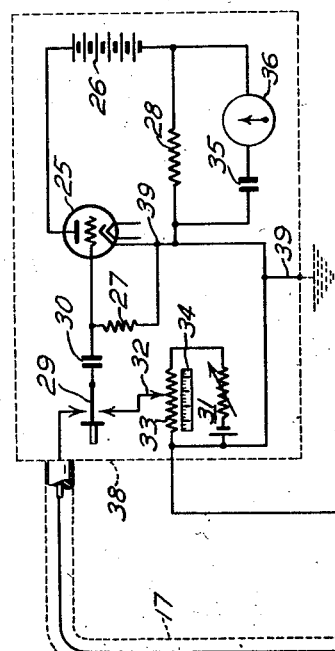
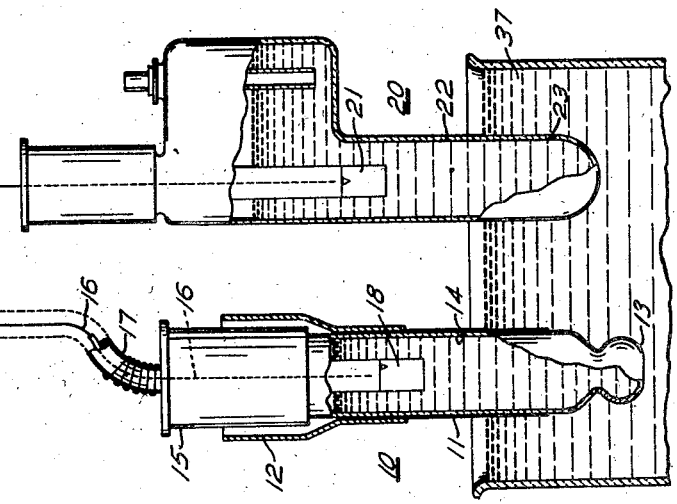
INVENTOR
GEORGE A. PERLEY
BY
Woodward and Phelan
ATTORNEYS Patented Aug. 7, 1951

2,563,062

UNITED STATES PATENT OFFICE 2,563,062

ELECTROSTATIC SHIELD FOR pH ELECTRODES

George A. Perley, Wyncote, Pa., assignor to Leeds and Northrup Company, Philadelphia, Pa., a corporation of Pennsylvania Application January 7, 1947, Serial No. 720,548

4 Claims. (Cl. 204—195)

1

This invention relates to high resistance pH-responsive electrodes, such as glass electrodes, and has for an object the provision of a means for effectively eliminating the effects of electrostatic stray fields and the like from the measuring system utilized with the electrodes.

In systems for measurement of pH values, to determine the acidity or alkalinity of solutions, many electrodes have resistances which usually lie within the range of 100 megohms to 2000 megohms but which may be of even higher resistance. To measure the voltages produced by such electrodes, it is necessary to use electronic instruments having an input stage characterized by low grid currents. Such instruments including their amplifiers are extremely sensitive to electrostatic disturbances affecting the input grid circuit produced by phenomena including such electrostatic effects as may be produced by the mere scuffing of a shoe on linoleum, or the like.

In the past, it has been common practice to mount the amplifiers in metal cabinets to shield them from external effects and to provide shielded cables leading from the metal cabinets and amplifiers to the electrodes immersed in the solution under measurement. In such systems, there has been present in the input grid circuit an unshielded conductor extending from the upper portion of the electrode assembly into the lower portion thereof which is immersed in the solution under measurement. Though the unshielded length has been small, nevertheless, the system as a whole has been adversely affected by electrostatic effects of the kind mentioned above. It has been proposed to extend the shielding of the conductor leading to the glass electrodes but this has required very special and relatively expensive construction not readily adaptable to electrodes of the standard type which have been in use for many years.

In carrying out the present invention in one form thereof, electrodes of previously standard design may be utilized by providing on the outside thereof a conducting shield which extends about them from a level below the surface of the liquid under measurement to a point overlapping the shield on the wire leading to the glass electrode. More specifically, the intermediate portion of the glass electrode may be provided with a conductive coating which serves, by immersion in the liquid under measurement, to produce an electrical effect the same as though the electrode were immersed in the solution to the full height of the conductive coating. This coating and the shield on the wire interconnecting the input circuit of the amplifier and the glass electrode preferably overlap. Accordingly, any electrostatic fields are directed away from the grid circuit in avoidance of any effect thereon.

For a more detailed understanding of the invention and for further objects and advantages thereof, reference is to be had to the accompanying drawing, in which:

Fig. 1 diagrammatically illustrates a system embodying the invention;

Fig. 2 illustrates a modification of the invention as applied to a typical pH electrode; and Fig. 3 is a fragmentary sectional view of a still further modification of the invention.

Referring to the drawing, the invention in one form has been shown applied to a pH-responsive electrode assembly or half-cell 10. Except for the external conductive shields 11 and 12, the electrode assembly 10 is of conventional design. Briefly, it consists of a glass membrane 13 attached to a tubular glass support or stem 14 which is itself carried by a metallic cap 15 through which there extends an inner conductor 16 provided with conventional insulation and an outer conductive shield 17. The supporting tube or elongated stem 14 is filled with a buffer solution of selected hydrogen ion concentration, for example, a solution of potassium chloride and acid potassium phthalate prepared to have a desired pH value. Extending into the buffer solution is a reference electrode 18 which may be of the type disclosed in Fig. 2 of Godshalk Patent 2,387,727.

Cooperating with the glass or measuring electrode 10 is a reference electrode 20 of conventional construction, such as shown in Fig. 1 of the aforesaid Godshalk patent. Briefly, it consists of a reference electrode 21 of the same character as the electrode 18. The electrode 21 is immersed in a salt-bridge which includes a tubular support 22 in which there is provided a microscopically small hole 23 constructed in accordance with my Patent 2,345,498 of March 28, 1944.

The voltage produced by the cell comprising the half-cells 10 and 20 may be measured in any suitable manner, an illustrative arrangement being shown and comprising a vacuum tube or thermionic amplifier 25 provided with a suitable source of anode supply, such as a battery 26, a grid resistor 27 and a plate or anode resistor 28. By means of a single-pole double-throw switch 29, which may be manually operated, there may be applied through the coupling capacitor 30 either the voltage from the cell 10—20, or a voltage derived from a potentiometer 31. The voltage from the potentiometer may be varied by moving a slidewire contact 32 with respect to the resistor 33. A suitable scale 34 may be calibrated in terms of pH values, or in other units, as may be desired.

In operation, the switch 29 is operated alternately to connect the grid of tube 25 through its coupling capacitor 30 to the half-cell 10 or to the potentiometer 31. If the potential developed by the cell 10—20 differs from that derived from the potentiometer 31, a resultant flow of current in the output circuit including the resistor 28 will produce in the circuit including a capacitor 35 and a sensitive galvanometer 36, a momentary deflection thereof in a direction dependent upon the direction of change of the voltage on the grid of the amplifier 25. The movable contact 32 is then moved in direction to decrease the deflection of the galvanometer 36. The operations are continued until there is no deflection on the galvanometer 36, at which time the reading on the scale 34 will be a measure of the pH value of the solution 37 in which the lower ends of the half-cells or electrode assemblies 10—20 are immersed.

In the absence of the present invention, the presence of any electrostatic field emanating from whatever source, and terminating on unshielded portions of conductor 16 or the solution within support 14, would produce a change in the potential on the grid of tube 25 and thus vary the deflection of the galvanometer 36 notwithstanding there was no change in the pH value of the solution 37.

In this connection, it is important to observe that the conductive path comprising conductor 16, reference electrode 18, and the buffer solution within half-cell 10 is terminated by extremely high resistances, of the order of 100 megohms to 2000 megohms, such terminations being the open contact of switch 29 or the grid capacitor 30 on one end and the glass electrode including membrane 13 on the other end. Due to the high terminating resistances of the aforesaid conductive path forming a part of the input grid-circuit, it readily acquires a high potential in the presence of an electrostatic field. The potential changes so produced on the conductive path of course cause the undesired effects already described. On the other hand, the remaining part of the grid-input circuit is of very low resistance, of the order of 1000 ohms and, therefore, cannot have produced in it potentials affecting the accuracy and reliability of the measurement.

Effects of the aforesaid character are entirely eliminated by the present invention which is characterized by the provision of a conducting envelope 11 which surrounds the supporting tube on stem 14, and extends from a subsurface level of the solution 37 upwardly in overlapping relationship with a second conducting envelope 12 which at its lower end is provided with a plurality of spring fingers in intimate electrical engagement with the protective envelope 11 and extending upwardly into overlapping relationship with a metallic cap 15 which is electrically connected to the shield 17. The shield 12 is spaced outwardly from the metallic cap 15 to insulate them one from the other. Accordingly, the presence of an electrostatic field in and around the electrode assembly 10 does not and cannot affect the conductive path including conductor 16. It cannot reach it. If it exists in the region immediately above the level of the liquid or solution 37, it terminates on the conductive envelope 11 and cannot penetrate it to affect the conductive path including conductor 16. If the electrostatic field exists in the region of the conductive shield 12, the same protection is afforded. If the electrostatic field terminates on the metal cap 15, it is apparent that it can have no effect since the cap forms an extension of the shield 17 which is electrically connected to the metallic housing of the amplifier indicated by the broken line 38 and which, it will be observed, is electrically connected by conductor 39 to the cathode of the tube 25. If desired, the solution may be grounded or the metallic enclosure 38, which is always provided, may be grounded as indicated by the conventional symbol, shown in broken lines.

The provision of the electrically conductive envelopes produces a shielding effect which is the same as would be produced by completely immersing the glass electrode 10 in the solution 37. However, this may not be done since contact by the metal cap 15 with the solution would short-circuit the half-cell 20. Even if the metal cap 15 were omitted, the immersion could not be complete unless special insulation were provided, which it is the purpose of this invention to avoid. Moreover, the testing of specimens available only in small quantity precludes deep immersion. Even where the requisite amount of solutions might be available, it is desirable to avoid immersion of the electrode in any more of the solution than is necessary in order to minimize cleaning difficulties and to minimize the need to handle large quantities of solutions. Thus, the lower end of the shield 11, as shown, closely approaches membrane 13 to assure immersion of the lower end thereof with immersion of membrane 13.

Now that the principles of the invention have been described, it will be understood by those skilled in the art that the invention may take other forms. For example, the conductive envelope 12 as shown in Fig. 1 may extend from its overlapping relationship with the metal cap 15 downwardly below the level of the solution 37, thus avoiding the need for the conductive envelope 11. For example as shown in Fig. 2, which is a half-cell of construction identical with that of Fig. 1 except in the following respects, the cap 15a of the half-cell 10a may be insulated from the tubular glass support 14a by means of an insulating ring or bushing 40 of "Lucite," a methyl methacrylate, or by an insulating ring of polystyrene. In this modification, the cap 15a extends downwardly materially below the upper end of, and in overlapping relationship with, the conductive envelope 11a provided on the exterior of the supporting stem 14a. In this manner, there is eliminated the need for the additional conductive envelope 12 utilized in the modification of Fig. 1.

In a still further form of the invention, the conductive envelope 42 may be a tabular conductor of substantially larger diameter than either the cap 15 or the tubular support 43 which corresponds with the supporting stem 14 of Fig. 1 and with supporting stem 14a of Fig. 2 except the conductive envelopes 11 and 11a have been omitted. As shown in Fig. 3 the tubular conductor 42 is formed of metal and is supported in overlapping relationship with the metal cap 15 by means of a plurality of inwardly-extending spring fingers 44 disposed in circular array around the conductor or envelope 42. For the shielding of existing pH electrodes the construction of Fig. 3 is well adapted for application thereto although conductive coatings such as silver paint may be employed. However it is preferred, as in Figs. 1 and 2, to apply to the tubular supporting stem 14 at the time of manufacture thereof a conductive film of gold or platinum which after firing produces a strong and adherent conductive layer. The foregoing may be taken as suggestive since those skilled in the art are familiar with other ways of producing conductive coatings or films in or on glass supports, the requirement being that such coatings or films be electronic conductors, also known as conductors of the first class, as are the silver-paint coating, the film of gold or platinum and the tubular metallic conductor 42.

While preferred embodiments of the invention have been described, it is to be understood that other modifications may be made within the spirit and scope of the appended claims.

What is claimed is:

1. The combination with an electrode comprising an elongated supporting stem of insulating material, an ion-responsive membrane carried by one end of said stem for immersion in a liquid and means including a shielded conductor for completing an electrical circuit to the inner surface of said membrane, of electrostatic shielding means at the same electrical potential as the liquid in which said membrane is to be immersed and insulated from said shielded conductor comprising an electronic conductor of tubular shape encircling the outer surface of said stem and extending lengthwise thereof from a region adjacent said membrane normally disposed at a subsurface level of the liquid upon immersion of said membrane therein to a region adjacent the opposite end of said stem.

2. The combination with an electrode comprising an elongated glass supporting stem, an ion-responsive membrane carried at one end of said stem for immersion in a conductive liquid whose ion concentration is to be measured, means including a conductor for completing an electrical circuit to the inner surface of said membrane and an electrostatic shield for said conductor, said shield terminating adjacent the end of said stem remote from said membrane, of electrostatic shielding means comprising an electronic conducting coating substantially coextensive in length with said stem and forming the external surface of said glass stem from a region sufficiently close to said membrane to be in contact with said liquid upon immersion therein of said membrane to extend the conductive path of said liquid about and along the electrode to a point adjacent to the termination of said shield of said conductor but spaced therefrom in avoidance of electrical connection therewith.

3. For use in a system of measuring ion concentration of a liquid, the system including a shielded amplifier, a conductor for an input circuit thereof, an electrostatic shield for said conductor in encircling spaced relation therewith, an elongated stem of insulating material, an ion-responsive membrane carried by one end of said stem for immersion in said liqu'd, said conductor extending beyond an end of its associated electrostatic shield and into said stem for completing an electrical circuit to the inner surface of said membrane, the improvement which comprises means including an electrostatic shield for said stem disposed with respect to said membrane for intimate contact with said liquid upon immersion of said membrane in said liquid, said shield comprising an electrical conductor of tubular shape encircling said stem and extending from a point adjacent said membrane along the outer surface of said stem to a point substantially at the opposite end of said stem and in overlapping spaced relation with the electrostatic shield for said conductor.

4. For use in a system of measuring ion concentration of a liquid, the system including a shielded amplifier, a conductor for an input circuit thereof, an electrostatic shield for said conductor in encircling spaced relation therewith, an elongated glass supporting stem, and an ion-responsive membrane carried by one end of said stem for immersion in said liquid, said conductor extending beyond an end of its associated electrostatic shield and into said stem for completing an electrical circuit to the inner surface of said membrane, the improvement which comprises electrostatic shileding means between said shielding means of said conductor and said liquid comprising an electrically conductive coating forming the external surface of said stem substantially co-extensive in length therewith and terminating at a point adjacent said membrane which is normally immersed in said liquid with immersion of said ion-responsive membrane and terminating short of the shielding of said conductor, and additional electrostatic shielding means encircling said stem and of a length greater than the separation distance between the upper end of said coating and said shield of said conductor and electrically connected to only one of them.

GEORGE A. PERLEY.

REFERENCES CITED

The following references are of record in the file of this patent:

UNITED STATES PATENTS

| Number | Name | Date |
|---|---|---|
| 2,085,761 | Beckman et al. | Oct. 27, 1936 |
| 2,256,733 | Carry et al. | Sept. 23, 1941 |
| 2,285,482 | Wunsch | June 9, 1942 |
| 2,311,977 | Coleman | Feb. 23, 1943 |
| 2,383,450 | Coleman | Aug. 28, 1945 |
| 2,395,425 | Osborne | Feb. 26, 1946 |

OTHER REFERENCES

"Science," vol. 92, No. 2391, October 25, 1940, pages 385, 386.